US012565199B2

(12) United States Patent
Agrawal et al.

(10) Patent No.: US 12,565,199 B2
(45) Date of Patent: Mar. 3, 2026

(54) SYSTEMS AND METHODS FOR RAPID DECELERATION

(71) Applicant: Zoox, Inc., Foster City, CA (US)

(72) Inventors: Varun Agrawal, Mountain View, CA (US); Jacob Daniel Boydston, Foster City, CA (US); Taylor Scott Clawson, Hyde Park, UT (US); Joshua Dean Egbert, Redwood City, CA (US); Brian Michael Filarsky, San Francisco, CA (US); Joseph Funke, Redwood City, CA (US); Noureldin Ehab Hendy, Foster City, CA (US); Richard Hsieh, San Francisco, CA (US); Glenn Xavier Liem, San Francisco, CA (US); David Benjamin Lu, Redwood City, CA (US); Leonardo Poubel Orenstein, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 447 days.

(21) Appl. No.: 17/815,994

(22) Filed: Jul. 29, 2022

(65) Prior Publication Data

US 2024/0034308 A1 Feb. 1, 2024

(51) Int. Cl.
| | |
|---|---|
| *B60W 30/09* | (2012.01) |
| *B60T 7/22* | (2006.01) |
| *B60W 50/14* | (2020.01) |

(52) U.S. Cl.
CPC ............... *B60W 30/09* (2013.01); *B60T 7/22* (2013.01); *B60W 50/14* (2013.01);
(Continued)

(58) Field of Classification Search
CPC .. B60W 30/09; B60W 50/14; B60W 2520/04; B60W 2520/10; B60W 2552/15;
(Continued)

(56) References Cited

U.S. PATENT DOCUMENTS

| | | | |
|---|---|---|---|
| 2,160,458 | A | 5/1939 | Gladding |
| 11,002,859 | B1 | 5/2021 | Zhang et al. |

(Continued)

FOREIGN PATENT DOCUMENTS

WO WO2020160798 A1 8/2020

OTHER PUBLICATIONS

International of Search Report and Written Opinion mailed May 9, 2023 for related International Application No. PCT/US2023/060872 (10 pages).

*Primary Examiner* — Faris S Almatrahi
*Assistant Examiner* — Moises Gasca Alva
(74) *Attorney, Agent, or Firm* — Lee & Hayes, P.C.

(57) ABSTRACT

Systems and techniques for determining a trajectory for use in controlling a vehicle are described. A trajectory determination system may generate a variety of trajectories for potential use in controlling a vehicle, including a maximum braking trajectory that enables the maximum application of the vehicle's brakes. A vehicle computing system may determine a distance between vehicle and an obstacle and stopping distances for the various trajectories and implement the maximum braking trajectory after determining that the distance to stop for that trajectory is the same as, but not substantially greater than, the distance between the vehicle and the obstacle.

20 Claims, 5 Drawing Sheets

(52) U.S. Cl.
CPC ..... *B60W 2520/04* (2013.01); *B60W 2520/10* (2013.01); *B60W 2552/15* (2020.02); *B60W 2554/802* (2020.02); *B60W 2556/45* (2020.02); *B60W 2710/18* (2013.01)

(58) Field of Classification Search
CPC ....... B60W 2554/802; B60W 2556/45; B60W 2710/18; B60W 2552/40; B60W 2555/20; B60T 7/22
See application file for complete search history.

(56) References Cited

U.S. PATENT DOCUMENTS

| | | | |
|---|---|---|---|
| 2007/0182623 A1 | 8/2007 | Zeng et al. | |
| 2013/0110368 A1* | 5/2013 | Zagorski | B60T 7/22 |
| | | | 701/70 |
| 2017/0056755 A1 | 3/2017 | Lapierre et al. | |
| 2018/0099648 A1* | 4/2018 | Won | B60T 8/172 |
| 2018/0101738 A1 | 4/2018 | Mualla | |
| 2019/0004166 A1 | 1/2019 | Orlowski et al. | |
| 2019/0122558 A1* | 4/2019 | Matsunaga | B60W 30/09 |
| 2019/0291728 A1* | 9/2019 | Shalev-Shwartz | |
| | | | B60W 30/18154 |
| 2020/0117206 A1* | 4/2020 | Egnor | B60W 30/0953 |
| 2020/0152279 A1 | 5/2020 | Oh et al. | |
| 2020/0211394 A1* | 7/2020 | King | B60W 50/023 |
| 2021/0114625 A1 | 4/2021 | Liu | |
| 2022/0413484 A1* | 12/2022 | Choi | G08G 1/167 |

* cited by examiner

100

200 ⌐

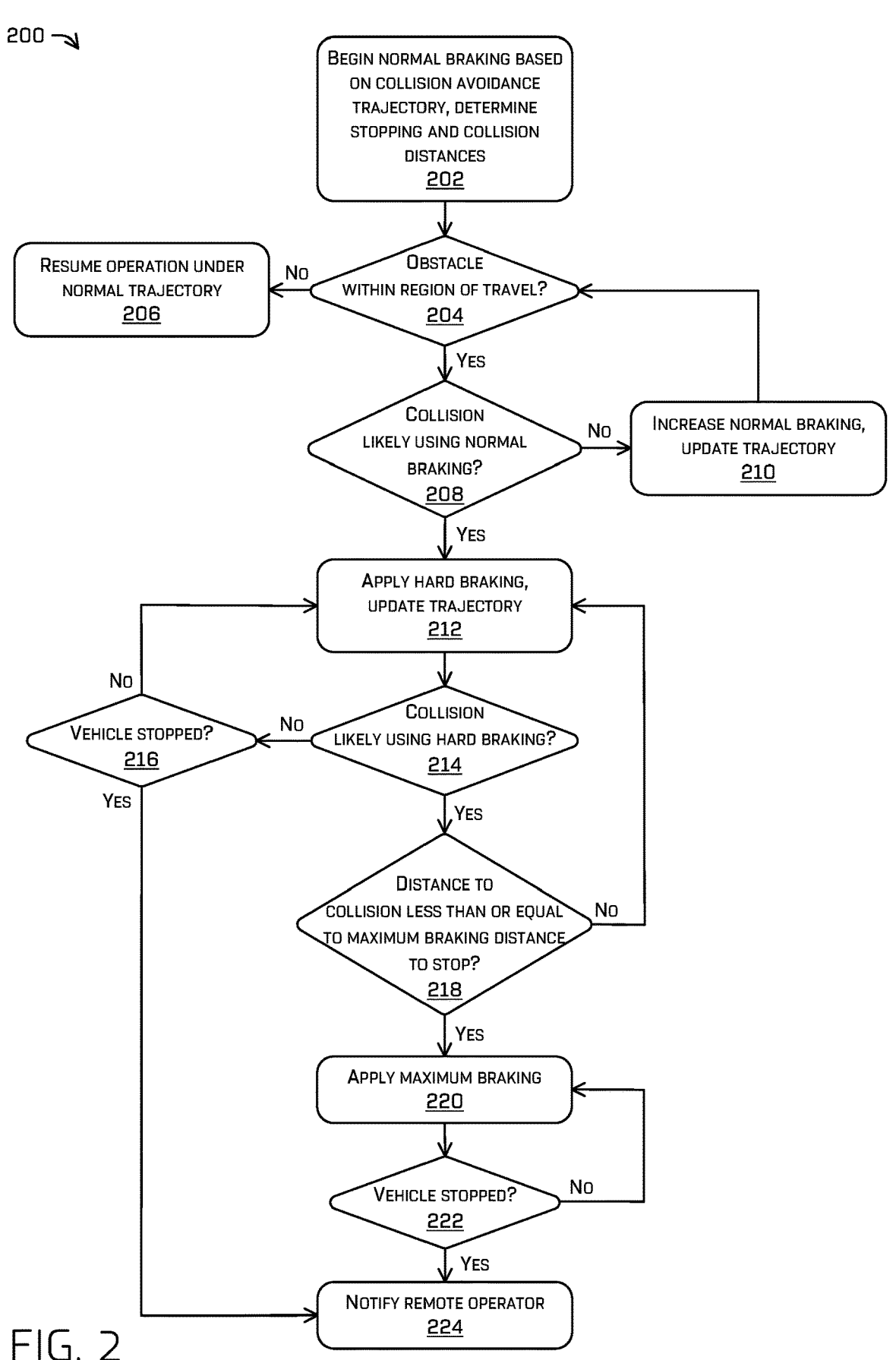

BEGIN NORMAL BRAKING BASED
ON COLLISION AVOIDANCE
TRAJECTORY, DETERMINE
STOPPING AND COLLISION
DISTANCES
202

OBSTACLE
WITHIN REGION OF TRAVEL?
204

No → RESUME OPERATION UNDER
NORMAL TRAJECTORY
206

YES

COLLISION
LIKELY USING NORMAL
BRAKING?
208

No → INCREASE NORMAL BRAKING,
UPDATE TRAJECTORY
210

YES

APPLY HARD BRAKING,
UPDATE TRAJECTORY
212

COLLISION
LIKELY USING HARD BRAKING?
214

No → VEHICLE STOPPED?
216

No

YES

DISTANCE TO
COLLISION LESS THAN OR EQUAL
TO MAXIMUM BRAKING DISTANCE
TO STOP?
218

No

YES

APPLY MAXIMUM BRAKING
220

VEHICLE STOPPED?
222

No

YES

NOTIFY REMOTE OPERATOR
224

SYSTEMS AND METHODS FOR RAPID DECELERATION

BACKGROUND

Vehicles may be equipped with systems used to detect objects in an environment and control the vehicle to avoid the objects. Vehicles may also be equipped with a trajectory planning system that determines a trajectory for the vehicle under various conditions, such as when an obstacle is detected in the path of the vehicle. When an obstacle is detected in a vehicle path, the vehicle may be configured to take various collision prevention and/or mitigation actions. A vehicle trajectory may also be generated and/or updated to increase the likelihood of avoiding a potential collision and/or mitigating damage that may result from a collision.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 2 illustrates another example process for determining and implementing rapid deceleration in a vehicle.

DETAILED DESCRIPTION

Figure 1:
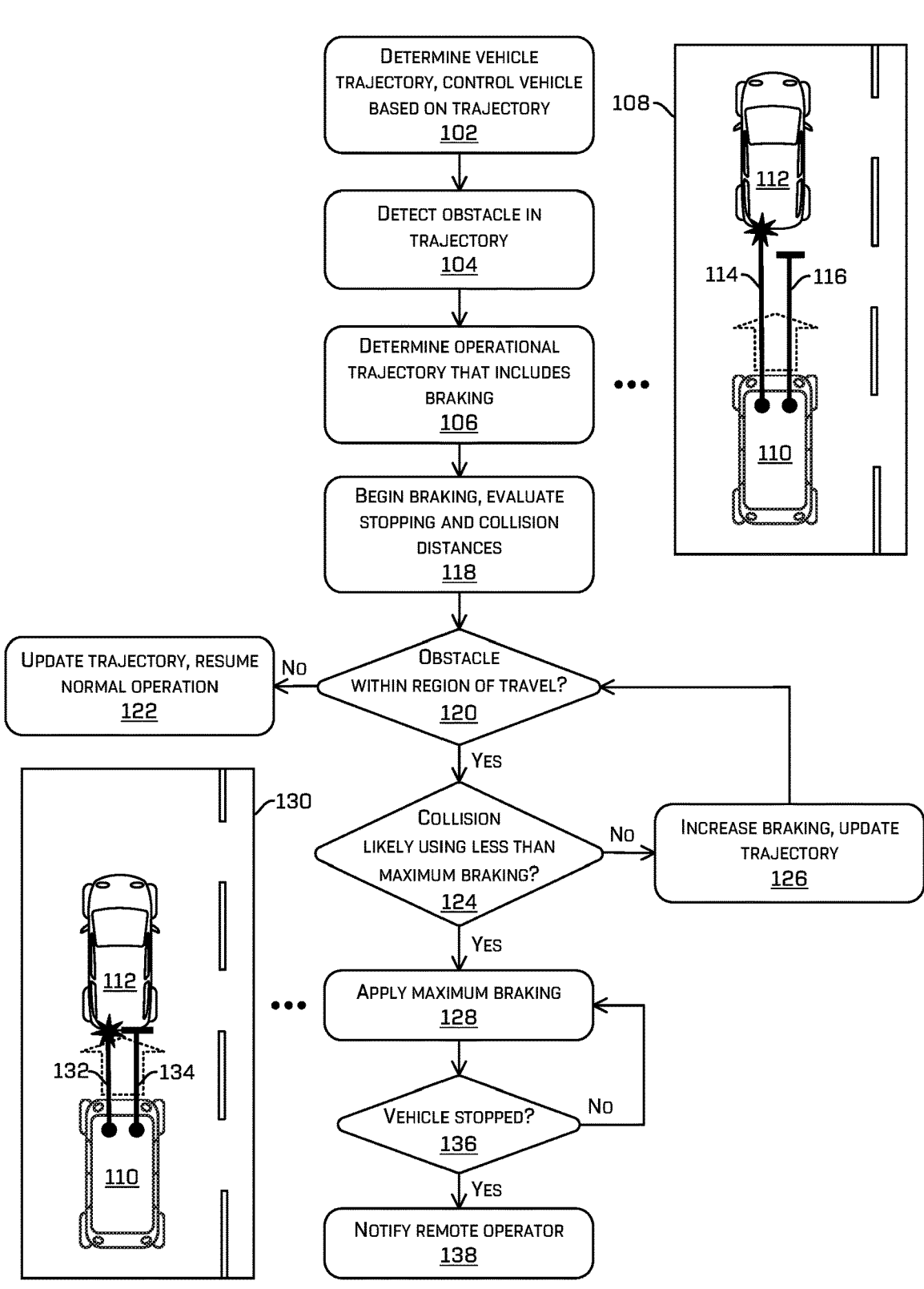
FIG. 1 illustrates an example process for determining and implementing rapid deceleration in a vehicle, in accordance with examples of the disclosure.

The application of a maximum braking level in a vehicle may result in sudden stops that may increase the risk of collision by a following vehicle and/or negative effects on passengers in the vehicle. Various techniques described herein may be used to determine when to apply a maximum braking level while otherwise using lesser braking applications levels. As described herein, various examples provide for delay of moving to higher braking levels until a threshold is reached to prevent from false positives, allow the compute system to account for changing environmental conditions, and reduce the discomfort of passengers due to unnecessary brake force being applied. For example, systems and techniques for determining a braking level to apply at a vehicle to implement rapid deceleration based on various criteria are discussed herein. For example, techniques may include detecting an obstacle in a path of travel of a vehicle traversing an environment and determining a trajectory based the detection. A vehicle computing system may determine that the trajectory requires braking (e.g., in order to avoid an obstacle) and may further determine a braking application level based on a distance to stop associated with one or more braking application levels and an estimated intersection distance with the obstacle (e.g., an estimated distance to collision with the obstacle) associated with the one or more environmental and/or vehicle conditions. If the braking application level currently in use is insufficient to prevent a potential collision with an obstacle, the vehicle may increase the braking level. If the vehicle computing system determines an intersection or collision with the obstacle is unavoidable without using a maximum level of braking application, the vehicle computing system may control the vehicle to apply the maximum braking level.

A vehicle trajectory may include steering controls, acceleration controls, and/or other vehicle control information that may be used by a vehicle computing system to control the vehicle through the environment. In various examples, a trajectory determination system may determine one or more trajectories based on various current and/or predicted vehicle and/or environmental conditions. The trajectory determination system may determine a particular trajectory from the one or more trajectories determined based on vehicle and/or environmental conditions for use in controlling the vehicle at a current time. The trajectory determination system may (e.g., substantially continuously and/or periodically) evaluate vehicle and/or environmental conditions over time and determine or otherwise update a trajectory for use controlling the vehicle.

In various examples, the trajectory determination system may determine and/or modify one or more trajectories to achieve one or more levels of braking application. Such trajectories may be based on a detected obstacle. For example, the trajectory determination system may determine a trajectory for normal braking and operating conditions that may include a predicted distance to stop using normal braking application levels, a distance to intersection or collision with the obstacle using normal braking application levels (e.g., a distance between a leading surface of the vehicle and the closest surface of the obstacle to the leading surface of the vehicle under application of the trajectory's normal braking application levels), a path of travel, and/or one or more other vehicle controls. A normal braking trajectory may allow for the greatest overall vehicle control and passenger comfort, and therefor may be desirable when such a trajectory includes sufficient braking application levels to allow the vehicle to avoid obstacles and potential intersections or collisions with obstacles in the environment.

The trajectory determination system may also, or instead, determine a trajectory for intermediate braking (e.g., increased or "hard" braking) and operating conditions that may include a predicted distance to stop using intermediate braking application levels, a distance to collision with the obstacle using hard braking application levels, a path of travel, and/or one or more other vehicle controls. In examples, a "hard" braking application level may be an intermediate braking level that is increased above or otherwise greater than normal braking but short of the full application of braking capabilities of a vehicle. A hard braking trajectory may allow for greater brake pressures using associated increased braking application levels to allow a vehicle to stop in a shorter distance (e.g., as compared to a normal braking trajectory) and therefore to avoid obstacles and potential collisions that may not be avoidable using lesser braking application levels. These improved (e.g., shortened) distances to stop, while at times resulting in reduced passenger comfort, increase the safety of vehicle operation by avoiding obstacles and/or potential collisions. The disclosed systems and techniques may be used to provide such hard braking trajectories when the use of trajectories having lesser braking application levels are insufficient for obstacle avoidance, thereby increasing passenger comfort and safe vehicle operation.

The trajectory determination system may further, or instead, determine a trajectory for full or "maximum" braking and operating conditions that may include a predicted distance to stop using a full or "maximum" braking application level, a distance to collision with the obstacle using the maximum braking application level, a path of travel, and/or one or more other vehicle controls. In examples, a "maximum" braking application level may be a braking level associated with the full application of available braking capabilities of a vehicle. In various examples, a trajectory determination system may determine the same lateral trajectory profile (e.g., same path of travel or region of travel in an environment) for a trajectory associated with maximum braking conditions as that used for a trajectory associated with hard braking conditions. A maximum braking trajectory may allow for the greatest (e.g., maximum) brake pressures available to a vehicle using an associated maximum braking application level to allow a vehicle to stop in a shortest distance (e.g., as compared to a hard braking or normal braking trajectory) and therefore to avoid obstacles and potential collisions that may not be avoidable using lesser braking application levels and, in some examples, to mitigate collision damage. This further improved (e.g., shortest) distance to stop using a maximum braking trajectory, while at times resulting in further reduced passenger comfort, increases the safety of vehicle operation by avoiding obstacles and/or potential collisions and mitigating collision damage. The disclosed systems and techniques may be used to provide such maximum braking trajectories when the use of alternative trajectories are insufficient for obstacle avoidance and/or damage mitigation, thereby increasing passenger comfort and safe vehicle operation. A trajectory associated with hard braking controls and/or maximum braking controls may retain the use of antilock braking capabilities or otherwise not include vehicle controls that prevent antilock braking functions.

The trajectory determination system may also, or instead, determine a trajectory for vehicle lock that may include controls that lock down or otherwise disable various components of the vehicle. For example, a vehicle lock trajectory may include activating the vehicle's parking brake, locking the steering, and applying maximum brake pressure (with or without disabling antilock braking functions). A vehicle lock trajectory may allow for a complete lock down and/or disablement of a vehicle and/or one or more of its components based on specific conditions, such as vehicle theft or malfunction. In at least some examples, either the vehicle lock trajectory and/or the maximum braking trajectory may be associated with an emergency braking system of the vehicle whereas the nominal and hard braking trajectories may be associated with a nominal brake system.

In various examples, the braking levels may be a range of brake application pressures. For example, normal braking application levels may be the range of brake application pressures from 0%-50% of available braking pressure (or, otherwise, a range in which passengers are typically accommodated to experiencing during nominal travel), the intermediate brake application pressures range may be 51%-99% (e.g., more forcefully braking than during nominal travel but less than some maximum), and the maximum braking pressure may be 100% (e.g., the absolute maximum braking possible). Other ranges and levels of braking pressures are contemplated and may be implemented in various examples.

Under normal operating conditions with no impeding objects or obstacles detected, a trajectory determination system may be configured to provide a vehicle computing system with a trajectory for controlling the vehicle under normal braking and operating conditions. The vehicle computing system, one or more sensors configured at the vehicle, and/or one or more other systems configured at the vehicle may be configured to provide (e.g., ongoing and/or updated) data to the trajectory determination system. Such data may include data associated with object detections (e.g., of objects in the environment in which the vehicle may be traveling), environmental conditions (e.g., rain, snow, clear weather, cold, hot, etc.), vehicle conditions (e.g., load, component conditions, current velocity, current braking level, etc.), and/or other conditions and/or aspects that may be useful in determining vehicle trajectories. The trajectory may be determined by the trajectory determination system based on such data received from one or more other (e.g., distinct) systems (e.g., sensor system, planner component, etc.) that may indicate environmental data, such as an obstacle and/or other objects in the environment in which the vehicle may be traveling, road surface conditions, precipitation, etc.

The trajectory determination system may use this data to determine one or more of the various trajectories described above. For example, the trajectory determination system may determine, based on data collected by or otherwise associated with sensors configured at the vehicle, that an obstacle is in the path of the vehicle based on the current trajectory in use for controlling the vehicle. The trajectory determination system may determine a normal braking and operating conditions trajectory that accounts for the obstacle, as well as hard braking and maximum braking trajectories that are also based on the detection of the obstacle. The trajectory determination system may also, or instead, determine a vehicle lock trajectory. In some examples, the trajectory determination system and/or a vehicle computing system may not determine a vehicle lock trajectory or may only determine a vehicle lock trajectory once (e.g., at vehicle start-up or vehicle computing system initiation) because individual vehicle lock trajectories may be substantially identical, with the various components indicated in such a trajectory being locked or otherwise disabled.

Based on the determined trajectories based on the detected obstacle, the trajectory determination system may determine a particular trajectory as a current operational trajectory for the vehicle computing system to use to control the vehicle (e.g., until a subsequent operational trajectory is determined). This trajectory determination may be based on aspects of the trajectories and with a preference for normal braking and operating conditions. In various examples, the available trajectories may be used in order of braking application. For example, a hard braking trajectory may be used (e.g., at least once or for a period of time) before a maximum braking trajectory may be used.

In various examples, a vehicle computing system may be configured to refrain from reverting to a lesser braking trajectory once an increased braking trajectory has been determined as an operational braking trajectory. For example, if the vehicle computing system determines a hard braking trajectory as an operational trajectory (e.g., after using a normal braking trajectory and/or to avoid or mitigate a collision), the vehicle computing system may be configured to allow the subsequent determination of maximum braking trajectory, or the retention of the hard braking trajectory, as an operational trajectory, but not the normal braking trajectory. For instance, once a vehicle computing system is using a hard braking trajectory as an operational trajectory, it may not use normal braking again until an operator intervenes. Similarly, if the vehicle computing system determines a maximum braking trajectory as an operational trajectory (e.g., after using a hard braking trajectory and/or to avoid or mitigate a collision), the vehicle computing system may be configured to continue the use of the maximum braking trajectory as an operational trajectory, but not to subsequently use the hard or the normal braking trajectories (e.g., until operator intervention). Return to normal braking operation may be prevented until one or more system checks are performed and/or one or more signals are received (e.g., from a remote user) to release the braking level to normal.

Braking levels applied based on a trajectory used in collision avoidance and/or mitigation situations, such as the hard braking trajectory, may also, or instead, be limited to increasing braking pressures. For example, the vehicle computing system may be configured to maintain or increase braking pressure based on the braking application levels available to the hard braking trajectory when using such a trajectory as an operational trajectory, but not to reduce braking pressure to a pressure less than a currently applied braking pressure. This ratcheting of braking application levels in collision avoidance and mitigation situations may assist in obtaining operator involvement prior to a return to normal operation to help improve vehicle operational safety and regulatory compliance. In any of the above trajectories, a lateral offset may be maintained from the originally received trajectory while modifying a longitudinal acceleration and velocity profile, though lateral modifications are contemplated.

If the trajectory determination system determines that a normal braking and operating trajectory may allow a vehicle to be controlled around an obstacle or be stopped before a potential collision with the obstacle, the trajectory determination system may provide that trajectory for control of the vehicle. Alternatively, if the vehicle is currently being controlled using a normal braking trajectory, and the trajectory determination system determines that the normal braking trajectory will not allow the vehicle to be controlled around the obstacle or be stopped before a potential collision with the obstacle, the trajectory determination system may provide a hard braking trajectory for control of the vehicle. In another example, if the vehicle is currently being controlled using a hard braking trajectory, and the trajectory determination system determines that the hard braking trajectory will not allow the vehicle to be controlled around the obstacle or be stopped before a potential collision with the obstacle, the trajectory determination system may provide a maximum braking trajectory for control of the vehicle.

Applying maximum braking pressure in a vehicle may have uncomfortable or even dangerous repercussions. For example, an application of maximum braking may result in the vehicle stopping in a very short distance, which may not allow one or more following vehicles to stop before colliding with the vehicle. Moreover, the application of maximum braking may result in discomfort for the vehicle occupants. However, such a maximum braking (despite discomfort, etc.) may result in the safest operation of the vehicle. Therefore, in various examples, further operations may be performed to determine whether to apply maximum braking at a vehicle.

For example, if a vehicle is currently being controlled using a hard braking trajectory, and the trajectory determination system determines that the hard braking trajectory will not allow the vehicle to be controlled around the obstacle or be stopped before a potential collision with the obstacle, the trajectory determination system may determine if the distance to collision with the obstacle associated with a maximum braking trajectory is greater than a distance to stop associated with the maximum braking trajectory. If so, the trajectory determination system may provide, or continue to provide, the hard braking trajectory for use in controlling the vehicle.

When the vehicle is currently being controlled using the hard braking trajectory, if the trajectory determination system determines that the hard braking trajectory will not allow the vehicle to be controlled around the obstacle or be stopped before a potential collision with the obstacle and that the distance to the potential collision with the obstacle associated with a maximum braking trajectory is substantially equal to or less than a distance to stop associated with the maximum braking trajectory, the trajectory determination system may provide the maximum braking trajectory for use in controlling the vehicle.

In examples, the trajectory determination system may be configured to refrain from using a maximum braking trajectory until a vehicle computing system determines that a potential collision is unavoidable using other available trajectories (e.g., associated with braking application levels that are less than a maximum braking application level) to avoid collision. That is, the trajectory determination system may not determine a maximum braking trajectory for operational use until a distance to stop and a distance to collision are substantially the same for the maximum braking trajectory. By delaying the use of a maximum braking trajectory and/or apply maximum braking pressure until a potential collision is imminent using other braking levels, the safety of vehicle operation is increased by attempting to avoid collisions with following vehicles and reduce passenger discomfort associated with maximum braking. The disclosed techniques for applying maximum braking may also allow the trajectory determination system to avoid the use of a maximum braking trajectory should the obstacle become non-impeding. For example, a detected obstacle may have been a false positive detection (e.g., a detection that was not the result of a sensor detecting a physical object) or may have moved out of the path of the vehicle (e.g., a quickly moving object (e.g., animal, another vehicle, etc.) crossing the vehicle's path). In such cases, even though a hard braking trajectory may indicate an imminent collision, it may not be advantageous to use a maximum braking trajectory earlier than needed.

In various examples, the use of a hard braking trajectory and a maximum braking trajectory may result in a substantially similar distance to stop due to the time required to build brake pressure. For example, a vehicle computing system may be configured to use a hard braking trajectory before using a maximum braking trajectory as an operational trajectory. When using the hard braking trajectory, the vehicle computing system may increase pressure to the brakes based on that trajectory and may also determine to use the maximum braking trajectory as the next operational trajectory. The vehicle computing device may still be in the process of increasing the pressure to the brakes when the maximum braking trajectory is configured as the operation trajectory and thus the brake pressure increase will continue. The result of such a transition to maximum braking via hard braking may be the same stopping distance as if maximum braking was directly applied due to the time needed for the application of increased brake pressure.

In various examples, a distance to stop for a maximum braking trajectory may incorporate a buffer distance to account for stopping uncertainty. For example, a distance to stop under the application of maximum braking pressure in ideal or otherwise relatively good conditions (e.g., dry road surface, well-maintained braking system, good condition tires, light vehicle load, etc.) may be shorter than a distance to stop in less-than-ideal or otherwise relatively poorer conditions (e.g., wet and/or icy road surface, worn brake pads, worn tires, heavy vehicle load, etc.). Additionally, or alternatively, such a buffer distance may be based at least in part on any one or more of a current velocity, error messages of one or more components/subcomponents of the vehicle, number of passengers and/or their relative seating positions, uncertainty metrics from any component/subcomponent (e.g., perception, planning, prediction, etc.), weather condition, road surface grade (e.g., degree of slope or a type of hill), road surface type (e.g., pavement, asphalt, gravel, dirt, etc.). In such examples, a trajectory determination system may incorporate a stopping uncertainty buffer into the distance to stop for a maximum braking trajectory. This buffer may add an amount of distance to the maximum braking trajectory's distance. The buffer distance may be based on one or more criteria that may be variable, such as vehicle, environmental, and/or operating conditions. For example, the trajectory determination system may determine a buffer distance based on the vehicle's speed, road surface conditions, vehicle load, and/or the condition of the vehicle's braking components. The trajectory determination system may increase the maximum braking trajectory buffer distance if one or more such criteria are associated with causing the vehicle stopping distance to be increased over ideal or better conditions. Alternatively or additionally, the trajectory determination system may determine a buffer distance based on fixed criteria, such as a vehicle model, braking system components, other vehicle components, etc. Alternatively, the trajectory determination system may use a fixed and/or manually configured distance as a maximum braking trajectory buffer distance.

In various examples, the trajectory determination system may determine one or more trajectories as described herein repeatedly to substantially continuously determine such trajectories. The trajectory determination system may also, or instead, provide one or more available trajectories to a vehicle computing system substantially continuously so that the vehicle computing system (e.g., always) has one or more most current trajectories for use in controlling a vehicle. For example, trajectories may be determined substantially continuously and/or incrementally at particular time periods (e.g., every 100 milliseconds, 0.5 seconds, etc.). Alternatively, or in addition, trajectories may be determined based on changes in environmental, operational, and/or vehicle conditions (e.g., change in vehicle speed, object detection, light conditions, weather conditions, selection of a different trajectory type, etc.). By using current and/or updated trajectories, the systems and techniques described herein may increase the safety of operating a vehicle in an environment.

The systems and techniques described herein may be directed to leveraging object detection data, condition data, and trajectories to enable a vehicle, such as an autonomous vehicle, to more accurately determine a vehicle trajectory that may in turn be used for improved vehicle control and collision avoidance and/or mitigation operations, facilitating safer navigation through an environment and improved vehicle control in the event that an obstacle is detected. In particular examples, the systems and techniques described herein can utilize data structures containing data representing a predicted region of travel, current and/or predicted positions of a vehicle and/or objects in an environment, environmental and/or vehicle conditions, and/or (e.g., previously determined and/or current) trajectory data. By using the trajectory determination techniques described herein to more accurately determine an operational trajectory, the examples described herein may result in increased safety and accuracy of vehicle control, especially vehicle stopping operations in potentially hazardous situations, thereby allowing an autonomous vehicle to more safely operate in an environment.

For example, the techniques described herein may be faster and/or more robust than conventional techniques, as they may increase the ability of an autonomous vehicle to safely navigate in an environment and avoid potential collisions with objects in the environment, thereby reducing the likelihood of a collision. That is, techniques described herein provide a technological improvement over existing vehicle trajectory determination technology. The techniques described herein may also improve the operation of computing systems and increase resource utilization efficiency. For example, computing systems, such as vehicle computing systems, may more efficiently perform trajectory determinations using the techniques described herein because the disclosed examples may reduce the amount of trajectory data needed to represent a various types of trajectories (e.g., by using the same lateral trajectory profile for both hard braking trajectories and maximum braking trajectories and/or by omitting a lateral trajectory profile from maximum braking and/or vehicle lock trajectories). Furthermore, computing systems, such as vehicle computing systems, may more efficiently perform trajectory determination operations and the calculations required to determine an operational trajectory by maintaining updated potential operational trajectories for a variety of situations, thereby requiring less processing to determine an operational trajectory under particular conditions than would be required using conventional techniques where a trajectory is generated in response to various conditions.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicles. In another example, the techniques can be utilized in an aviation or nautical context, or in any system involving vehicle or object trajectories and/or collision avoidance and/or mitigation operations. Further, although discussed in the context of originating with particular types of sensor data and processing with particular types of components, data and data structures as described herein can include any two-dimensional, three-dimensional, or multi-dimensional data and data associated with any types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like) or any combination of thereof.

Figure 3:
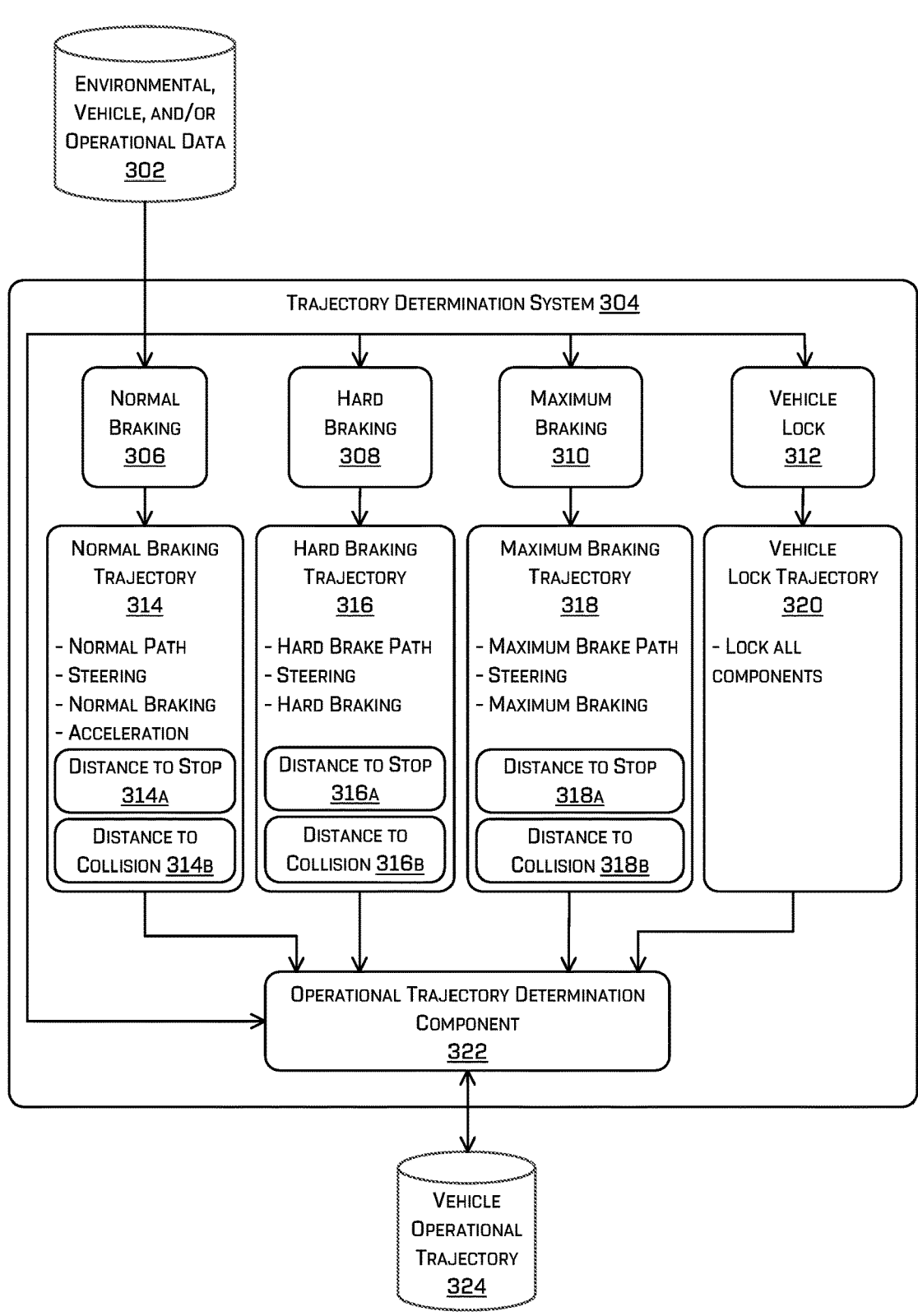
FIG. 3 is a block diagram of an example trajectory determination system, in accordance with examples of the disclosure.

FIG. 1 is a pictorial flow diagram of an example process 100 for determining a vehicle trajectory and controlling a vehicle using one or more such trajectories. In examples, one or more operations of the process 100 may be implemented by a vehicle computing system, such as by using one or more of the components and systems illustrated in FIGS. 3 and 5 and described below. For example, one or more components and systems can include those associated with trajectory determination system 304 illustrated in FIG. 4 or trajectory determination system 532 illustrated in FIG. 5. In examples, the one or more operations of the process 100 may be performed by a remote system in communication with a vehicle, such as trajectory determination system 552 illustrated in FIG. 5. In still other examples, the one or more operations of the process 100 may be performed by a combination of a remote system and a vehicle computing systems. However, the process 100 is not limited to being performed by such components and systems, and the components and systems of FIGS. 3 and 5 are not limited to performing the process 100.

At operation 102, a vehicle computing system may determine or otherwise receive an operational vehicle trajectory for use in controlling a vehicle traveling in an environment. A trajectory may be determined by a trajectory determination system based on data received from one or more other systems (e.g., sensor system, planner component, etc.) that may indicate environmental data, such as an obstacle and/or other objects in the environment in which the vehicle may be traveling. This trajectory may include data indicating an intended and/or predicted region of travel for the vehicle in the environment and steering controls, acceleration controls, braking controls, and/or other vehicle control information that may be used by the vehicle computing system to control the vehicle. In various examples, a trajectory may also include vehicle, operational, and/or environmental condition data and/or detection data (e.g., associated with one or more objects and/or features detected within the environment). Further at operation 102, the vehicle computing system may control the vehicle in the environment based, at least in part, on this operational trajectory.

At operation 104, the vehicle computing system may receive and/or determine additional data that may initiate operations to determine one or more new or updated trajectories, such as one or more candidate trajectories and an operational trajectory. Alternatively or additionally, the vehicle computing system may include such additional data in scheduled and/or ongoing trajectory determination operations (e.g., not necessarily initiated in response to the additional data). For example, the vehicle computing system may determine, based on sensor data captured by sensors configured at the vehicle, that an obstacle is present in the current region of travel represented in the current operational trajectory.

At operation 106, an operational trajectory for controlling the vehicle may be determined from one or more candidate trajectories. The one or more candidate trajectories may be determined based on the additional data determined at operation 104. For example, a trajectory determination system configured at the vehicle and/or interoperating with the vehicle computing system may determine one or more candidate trajectories based on a newly detected obstacle and, in some examples, other data, such as map and/or route data, sensor data, vehicle data, etc. Individual candidate trajectories may include particular vehicle control data and predicted vehicle performance data based on the respective trajectory. For example, one or more of the candidate trajectories may have a same lateral profile (e.g., a same region of travel or path) but differing longitudinal profiles based on the braking controls associated with the respective profile. For instance, a normal, hard, and maximum braking profile may have the same lateral profile, but the normal trajectory may have a normal braking longitudinal profile associated with normal braking application levels, the hard trajectory may have a hard braking longitudinal profile associated with hard braking application levels, and the maximum trajectory may have a maximum braking longitudinal profile associated with a maximum braking application level.

For example, as described in more detail herein, a normal braking trajectory may be determined as an operational trajectory at operation 106 that includes vehicle control data that may be used by a vehicle computing system to apply (e.g., a degree of) normal braking pressure at the vehicle. An example normal braking trajectory may also, or instead, include vehicle performance data, such as a predicted distance to stop for the vehicle if normal braking pressure as indicated by the vehicle control data is applied. Such vehicle performance data may also include a predicted distance to vehicle collision with the obstacle detected at operation 104 using the normal braking application level. For example, the vehicle performance data may include a current distance between the vehicle and the currently detected position of the obstacle as a distance to collision.

A maximum braking trajectory may also, or instead, be determined at operation 106. The maximum braking trajectory may include vehicle control data that may be used by a vehicle computing system to apply a maximum amount of braking pressure at the vehicle and vehicle performance data, including a predicted distance to stop if maximum braking pressure is applied. The maximum braking trajectory may also, or instead, include a current distance between the vehicle and the currently detected position of the obstacle as a distance to collision using the maximum braking application level. In various examples, the predicted distance to stop when maximum braking pressure is applied may include a buffer distance to accommodate an increase in such a distance due to less-than-ideal environmental conditions, operational conditions, vehicle conditions, tracking error, and the like.

Further at operation 106, one or more other candidate trajectories may be determined, including those described in more detail herein, such as a hard braking trajectory and a vehicle lock trajectory. The vehicle computing system and/or trajectory determination system may determine an operational trajectory from among the one or more candidate trajectories at operation 106.

An example 108 illustrates a top-down view of an environment in which a vehicle 110 may be traveling. The vehicle 110 may be configured with a sensor system that may allow a vehicle computing system configured at the vehicle 110 to collect data in the environment, detect objects, make various determinations, etc. The vehicle 110 may detect an object in the environment, such as the vehicle 112, that may be an obstacle. The vehicles 110 and 112 may be traveling in the same lane and in the same direction. The vehicle computing system of the vehicle 110 may determine, based on sensor data and/or other data, a distance between the vehicle 110 and the vehicle 112 as a distance to collision 114 using the current operational trajectory braking application level(s). In various examples, the vehicle computing system may associate the distance to collision 114 with a current operational trajectory and/or one or more candidate trajectories. The vehicle computing system of the vehicle 110 may also, or instead, determine, based on one or more candidate trajectories (e.g., including associated braking application level(s)), a distance to stop for the vehicle 110 for one or more trajectories. For example, the vehicle computing system may determine that, using the braking application level(s) available for the current operational trajectory, the vehicle 110 may have a distance to stop 116. As can be seen in this example, at the positions of the vehicles 110 and 112 and under vehicle control based on the current operational trajectory, the distance to stop 116 is less than the distance to collision 114. Therefore, under the conditions of the example 108, the vehicle computing device may determine that the current operational trajectory and available braking application level is sufficient to avoid a potential collision with the vehicle 112.

At operation 118, the vehicle computing system may implement the vehicle controls associated with the determined operational trajectory. For example, the vehicle computing system may apply (e.g., a degree of) normal braking pressure based on determining a normal braking trajectory as the operational trajectory at operation 106. In various examples, this application of braking pressure may be based on an estimated intersection distance to the obstacle (e.g., a distance to collision with the obstacle) and/or a distance to stop associated with the operational trajectory. Of course other factors are contemplated, such as geolocation, orientation of the vehicle (e.g., up or down a hill), road surface conditions, the presence of passengers, and the like.

At operation 120, the vehicle computing system may evaluate the current position of the vehicle relative to updated environmental and/or object data, for example, using sensor data representing detections in the environment. For instance, the vehicle computing system may receive updated (e.g., more current) environmental data that may include updated detections and/or other updated environmental data. The vehicle computing system may use such updated data to determine a current (e.g., updated) position of the obstacle detected at operation 104 and determine whether this obstacle is (e.g., still) within a region of travel associated with the operational trajectory. If not, for example, if the obstacle has moved out of the region of travel or the vehicle has been controlled around the obstacle, at operation 122, the vehicle computing system may resume normal control of the vehicle and/or obtain an updated trajectory that includes data associated with a region of travel that does not include the previously detected obstacle.

If, at operation 120, the vehicle computing system determines that the obstacle detected at operation 104 remains in the vehicle's region of travel, at operation 124 the vehicle computing system may determine whether a potential collision with the obstacle is likely using the current operational trajectory and/or applying braking pressure short of maximum braking pressure. For example, the vehicle computing system may determine whether a predicted distance to stop associated with the current operational trajectory is less than an estimated intersection distance or distance to collision for the current operational trajectory.

In various examples, the vehicle computing system may determine or otherwise use one or more predicted distances to stop associated with one or more levels of braking pressure that may be applied (e.g., based on a type of the current operational trajectory) and one or more associated estimated distances to collision in the determination performed at operation 124. For example, the current operational trajectory may be a normal braking trajectory. Normal braking pressure levels may vary from light to heavy, with various levels of pressure in between. The vehicle computing system may determine distances to stop based on one or more of these various levels of braking pressure and determine which, if any, of these braking pressure levels are associated with a potential collision (e.g., are associated with a predicted distance to stop that exceeds a distance to collision).

If the vehicle computing system determines at operation 124 that there is (e.g., at least one) braking pressure level available associated with the current operational trajectory that may cause the vehicle to avoid a potential collision with a detected obstacle, at operation 126 the vehicle computing system may determine the braking pressure associated with avoiding the potential collision and implement that pressure in the vehicle braking system (e.g., increasing normal braking pressure to shorten the distance to stop to be less than the distance to collision). Further at operation 126, the vehicle computing system may determine and/or obtain a new or updated operational trajectory, for example, from one or more candidate trajectories determined by the trajectory determination system and based on changing a current operating condition of the vehicle (e.g., increasing normal braking pressure). The vehicle computing system may then return to operation 120 to further determine whether the obstacle remains within the region of travel for the vehicle.

If, at operation 124, the vehicle computing system determines that the vehicle is unlikely to avoid a potential collision with the detected obstacle using the braking pressure(s) available under the current operational trajectory or trajectory type, the vehicle computing system may apply maximum braking pressure at operation 128. For example, the vehicle computing system may determine, at operation 124, that all levels of normal braking pressure associated with the current operational trajectory result in predicted distances to stop that exceed the estimated distance to collision represented in the trajectory. Based on this determination, the vehicle computing system may apply maximum braking pressure at operation 128.

In various examples, no updated trajectory may be obtained and/or determined at operation 128 because the application of maximum braking may use one or more of the same vehicle controls, other than braking, in use in a current operational trajectory. Alternatively, at operation 128 the vehicle computing system may retrieve or determine a maximum braking trajectory and configure that trajectory to be the current operational trajectory.

An example 130 illustrates a top-down view of an environment in which the vehicle 110 may be traveling, for example, at a time later than the time at which the vehicle 110 was traveling in the example 108. The vehicles 110 and 112 may still be traveling in the same lane and in the same direction, but at this point in time, the vehicle 110 may be closer to the vehicle 110 (e.g., because the vehicle 110 has slowed). The vehicle computing system of the vehicle 110 may determine, based on sensor data and/or other data, a distance between the vehicle 110 and the vehicle 112 as a distance to collision 132. In various examples, the vehicle computing system may associate the distance to collision 132 with a current operational trajectory and/or one or more candidate trajectories. The vehicle computing system of the vehicle 110 may also, or instead, determine, based on one or more candidate trajectories (e.g., including associated braking application level(s)), a distance to stop for the vehicle 110 for one or more trajectories. For example, the vehicle computing system may determine that, using the braking application level(s) available for the current operational trajectory, the vehicle 110 may have a distance to stop 134. In this case, and as can be seen in the example 130, for the positions of the vehicles 110 and 112 at this point in time and under vehicle 110 control based on the current operational trajectory, the distance to stop 134 is substantially similar to or greater than the distance to collision 132. Therefore, under the conditions of the example 130, the vehicle computing device may determine that a potential collision by the vehicle 110 with the vehicle 112 is likely unless maximum braking is used. The vehicle computing system of the vehicle 110 may therefore determine to use as a current (updated) operational trajectory a maximum braking trajectory and/or may determine to apply maximum braking pressure at the vehicle 110.

In various examples, a vehicle computing system may be configured to remain in a maximum braking condition and/or use a maximum braking trajectory until manual intervention is received. For example, a vehicle that has used maximum braking may be assumed to have had, or nearly had, a collision with an obstacle. Because there may be safety and regulatory implications associated with such collisions, an operator of the vehicle may wish to have a human investigation of the vehicle and/or environment before allowing the vehicle involved to resume normal operation.

Accordingly, at operation 136, the vehicle computing system may determine if the vehicle has been stopped due to the application of maximum braking. If not, the vehicle computing system may continue to apply maximum braking pressure and/or operate using a maximum braking trajectory as an operational trajectory at operation 128 until it detects that the vehicle has fully stopped at operation 136. If the vehicle has stopped, at operation 138, the vehicle computing system may transmit a notification of the application of maximum braking to a driver or remote operator associated with the vehicle or otherwise provide an indication of the application of maximum braking to a vehicle operator. In some examples, the vehicle computing system may also, or instead, transmit such a notification and/or provide such an indication to an operator or driver at the initiation of maximum braking application, for example, at an initial performance of operation 118.

FIG. 2 is a flow diagram of an example process 200 for determining a vehicle trajectory and controlling a vehicle using one or more such trajectories. In examples, one or more operations of the process 200 may be implemented by a vehicle computing system, such as by using one or more of the components and systems illustrated in FIGS. 3 and 5 and described below. For example, one or more components and systems can include those associated with trajectory determination system 304 illustrated in FIG. 4 or trajectory determination system 532 illustrated in FIG. 5. In examples, the one or more operations of the process 200 may be performed by a remote system in communication with a vehicle, such as trajectory determination system 552 illustrated in FIG. 5. In still other examples, the one or more operations of the process 200 may be performed by a combination of a remote system and a vehicle computing systems. However, the process 200 is not limited to being performed by such components and systems, and the components and systems of FIGS. 3 and 5 are not limited to performing the process 200.

At operation 202, a vehicle computing system may be controlling a vehicle traveling in an environment using an operational trajectory associated with normal braking application levels and intended to avoid a potential collision with an obstacle. This trajectory may include data indicating an intended and/or predicted region of travel for the vehicle in the environment and data indicating that an obstacle has been detected in the region of travel. Because there is an obstacle in the vehicle's region of travel, the operational trajectory may also include braking control data that the vehicle computing system may use to apply braking pressure at the vehicle. For example, the operational trajectory in use at operation 202 may be associated with normal braking application. Further at operation 202, the vehicle computing system may apply braking pressure, for instance, based on one or more levels of normal braking application.

At operation 204, the vehicle computing system may determine whether the obstacle associated with the operational trajectory remains within the region of travel associated with the vehicle. If not, for example, if the obstacle has moved out of the region of travel, is no longer detected (e.g., was a false positive obstacle detection), or the vehicle has been controlled around the obstacle, at operation 206, the vehicle computing system may resume normal control of the vehicle and/or obtain an updated operational trajectory that includes data associated with a region of travel that does not include the previously detected obstacle.

If, at operation 204, the vehicle computing system determines that the obstacle associated with the operational trajectory remains in the vehicle's region of travel, at operation 208 the vehicle computing system may determine whether a potential collision with the obstacle is likely using the current operational trajectory and/or applying braking pressure short of maximum braking pressure. For example, the vehicle computing system may determine whether a predicted distance to stop associated with the current operational trajectory is less than an estimated intersection distance or distance to collision associated with the current operational trajectory. In various examples, and as described herein, the vehicle computing system may determine one or more predicted distances to stop associated with one or more levels of braking pressure that may be applied based on the current operational trajectory. The vehicle computing system may compare these to one or more respective estimated distances to collision or intersection with the obstacle.

If the vehicle computing system determines at operation 208 that it is unlikely that a potential collision with the obstacle will occur using one or more of the braking pressure level available with the current operational trajectory, at operation 210 the vehicle computing system may determine the braking pressure associated with avoiding the potential collision and/or otherwise maintain or increase the braking pressure (e.g., within the bounds of the pressures associated with the current operational trajectory). Further at operation 210, the vehicle computing system may update the operational trajectory and/or determine a more current operational trajectory for use as the operational trajectory.

If, at operation 208, the vehicle computing system determines that a potential collision with the obstacle is likely using the vehicle control parameters available based on the current operational trajectory, the vehicle computing system at operation 212 may apply a greater level of braking pressure than that available under the normal conditions associated with the current operational trajectory. The vehicle computing system may also, or instead, obtain a new operational trajectory associated with this increased braking application level. For example, the vehicle computing system may obtain a "hard braking" trajectory that provides for increased braking pressure beyond normal braking pressures and/or apply such hard braking pressures at the vehicle.

Using this updated hard braking trajectory as an operational trajectory and associated brake application level(s), at operation 214 the vehicle computing system may determine if a potential collision is likely using the application of one or more hard braking levels. Like normal braking, hard braking may also have one or more application levels. Hard braking pressure levels may vary from relatively light (e.g., just greater than the heaviest normal braking pressure) to heavy (short of the maximum braking pressure), with various levels of pressure in between. The vehicle computing system may determine distances to stop and/or distances to collision based on one or more of these various levels of braking pressure and determine which, if any, of these braking pressure levels are associated with a potential collision (e.g., are associated with a predicted distance to stop that exceeds an estimated intersection distance or distance to collision).

If the vehicle computing system determines as operation 214 that a potential collision with the obstacle is likely to be avoided using hard braking, the vehicle computing system may the determine whether the vehicle has stopped at operation 216. Similar to maximum braking, in various examples, a vehicle computing system may be configured to remain in a hard braking condition and/or use a hard braking trajectory until manual intervention is received because a vehicle that has used hard braking may be assumed to have had, or nearly had, a collision with an obstacle. Here again, because there may be safety and regulatory implications associated with such collisions, an operator of the vehicle may wish to have a human investigation of the vehicle and/or environment before allowing the vehicle involved to resume normal operation. If the vehicle has not stopped yet, the process 200 may return to operation 212 to continue to apply hard braking until the vehicle stops, or until the vehicle computing system determines that the maximum braking may be needed.

If the vehicle computing system determines at operation 216 that the vehicle has been stopped due to the application of hard braking, the vehicle computing system may transmit a notification of the application of hard braking to a remote operator or driver associated with the vehicle or otherwise provide an indication of the application of hard braking to a vehicle operator at operation 224. In some examples, the vehicle computing system may also, or instead, transmit such a notification and/or provide such an indication to an operator at the initiation of a hard braking application, for example, at an initial performance of operation 212.

If, at operation 214, the vehicle computing system determines that the vehicle is unlikely to avoid a potential collision with the detected obstacle using hard braking and the associated hard braking trajectory that is currently serving as the operational trajectory, the vehicle computing system may determine whether a, estimated intersection distance or distance to collision with the object (e.g., as represented in the operational trajectory and/or a maximum braking trajectory) is substantially the same or less than a distance to stop associated with a maximum braking trajectory at 218. As described herein, one or more candidate trajectories may be determined by a trajectory determination system. An operational trajectory may be determined and/or selected from among these candidate trajectories. In various examples, a trajectory determination system may determine and/or provide a maximum braking trajectory among such candidate trajectories that, if not in use as an operational trajectory, may be available to a vehicle computing system and/or trajectory determination system. This maximum braking trajectory may include data representing a distance to stop and/or a distance to collision using maximum application of braking pressure at the vehicle. As described herein, this distance to stop for the maximum braking trajectory may include a buffer region or distance that accommodates the degradation of vehicle braking capability due to environmental, vehicle, and/or operating conditions that may affect braking performance. In examples, there may be one level of maximum braking pressure and therefore a single maximum braking application level.

Referring again to operation 218, the vehicle computing system may determine whether the distance to stop for the maximum braking trajectory is less than a threshold distance. This threshold distance may be equal or substantially similar to the distance to collision for the maximum braking trajectory. If the distance to stop for the maximum braking trajectory is less than the threshold distance (e.g., equal or substantially similar to the distance to collision), the vehicle computing system may return to applying hard barking pressures at operation 212. In various examples, even though a potential collision remains likely using hard braking pressures, it may not be desirable to apply maximum braking until a collision is imminent unless maximum braking pressures are used, as explained herein.

At operation 212, the vehicle computing system may update control of the vehicle based on data determined during other operations, such as operations 214 and 218. For example, the vehicle computing system may increase braking pressure at operation 212 using the hard braking trajectory based on determining that those operations to retain the hard braking trajectory as the operational trajectory and that the distance to collision remains likely using the hard braking trajectory.

If, at operation 218, the vehicle computing system determines that a threshold distance equal or substantially similar to the distance to collision for the maximum braking trajectory is less than or equal to a distance to stop for the maximum braking trajectory, the vehicle computing system may apply maximum braking and/or use the maximum braking trajectory as an operational trajectory at operation 220. If the distance to stop for the maximum braking trajectory is substantially similar to, or greater than, the distance to collision, it may indicate that a potential collision is imminent unless (and, in some examples, even if) the maximum braking application level is implemented. Therefore, maximum braking may be the (e.g. only) braking option available for avoiding the potential collision and/or mitigating damage from such a collision.

In various examples, no updated trajectory may be obtained and/or determined at operation 220 because the application of maximum braking may use one or more of the same vehicle controls, other than braking, in use in the hard braking trajectory. That is, in some examples, other than braking pressure, there may be no functional difference between a hard braking trajectory and a maximum braking trajectory. Alternatively, at operation 220 the vehicle computing system may retrieve or determine a maximum braking trajectory and configure that trajectory to be the current operational trajectory. In various examples, once operating with a maximum braking trajectory as an operational trajectory, a vehicle computing system may control the vehicle based on that trajectory until the vehicle is stopped and/or manual operator intervention is received.

As noted above, a vehicle computing system may be configured to remain in a maximum braking condition and/or use a maximum braking trajectory until manual intervention is received because the use of maximum braking may be assumed to be associated with a collision or a near-collision. Also as described herein, a human operator ay be notified of activation of maximum braking. Accordingly, at operation 222, the vehicle computing system may determine if the vehicle has been stopped due to the application of maximum braking. If not, the vehicle computing system may continue to apply maximum braking pressure at operation 220 until it detects that the vehicle has fully stopped at operation 222. If the vehicle has stopped, at operation 224, the vehicle computing system may transmit a notification of the application of maximum braking to a remote operator or driver associated with the vehicle or otherwise provide an indication of the application of maximum braking to a vehicle operator. In some examples, the vehicle computing system may also, or instead, transmit such a notification and/or provide such an indication to an operator at the initiation of maximum braking application, for example, at an initial performance of operation 220.

FIG. 3 is a block diagram of an operational trajectory determination system 300 according to various examples. The system 300 may be implemented at a vehicle (e.g., an autonomous vehicle) by a vehicle computing system and/or by a remote system. The system 300 may include one or more of the components and systems illustrated in FIG. 5 and described below. These components may be configured as described herein or in any other configuration and may perform any subset of their associated operations in any or and/or in conjunction with other one or more other operations. For example, one or more components and systems can include and/or be implemented using processors 516 and/or 544 and/or memories 518 and/or 546. In some examples, one or more operations performed by the system 300 may be implemented as a combination of a components at a remote system and a vehicle computing system. However, the system 300 is not limited to being performed by such components and systems, and the components and systems of FIG. 5 are not limited to implementing the system 300.

Environmental, vehicle, and/or operation data 302 may include one or more data structures representing one or more of various types of data that may be used to determine a trajectory. For example, environmental data may include weather condition data that may be used to determine braking and/or acceleration control data that may be included in a trajectory, map data that may be used to determine a region of travel that may be included in a trajectory, road condition data that may be used to vehicle control data that may be included in a trajectory, etc. Vehicle data may include data associated with vehicle component (e.g., brakes, tires, etc.) wear, vehicle load, vehicle model, vehicle version, configured components, etc. that may be used to determine data that may be included in a trajectory. Operational data may include current operational parameters, such as current vehicle velocity, vehicle acceleration, vehicle braking application level, etc. that may be used to determine data that may be included in a trajectory.

The data 302 may be provided to a trajectory determination system 304 that may be configured to determine one or more candidate trajectories and/or data associated with one or more candidate trajectories. The trajectory determination system 304 may also, or instead, determine, from among candidate trajectories, an operational trajectory for use in controlling a vehicle. The trajectory determination system 304 may include one or more trajectory determination components that may be configured to determine a particular type of trajectory. The trajectory types may be associated with types of vehicle controls. For example, the trajectories described herein may be associated with braking level types (e.g., normal, hard, maximum). However, the associated type used for descriptive purposes does not limit the use or data associated with such trajectories and a single trajectory may be alternatively referred to as being associated with any of multiple functions and/or vehicle controls.

Trajectories may include data representing vehicle paths (e.g., anticipated or predicted region of travel in an environment), vehicle controls (e.g., for use along the path, such as braking controls, acceleration controls, steering controls, etc.), and/or object and/or feature detections (e.g., positions of obstacles and/or other objects in the environment). In some examples, a lateral profile associated with steering controls and a longitudinal profile associated with acceleration and braking controls may be included in trajectory data.

In examples, trajectory data such as vehicle controls (e.g., steering controls, braking controls, etc.) may be associated with waypoints and/or particular portions of a path or region of travel, for example, to applied at that waypoint in the region of travel. Trajectories may also include one or more of various types of distances that may be used to determine vehicle controls. For example, a trajectory may include a distance to stop using a braking application level associated with that trajectory and/or data that facilitates the calculation of a distance to stop. In various examples, a distance to stop may depend on an amount of brake pressure applied and therefore may vary based on the applied pressure. In other examples, a type of trajectory may be associated with a type of braking that has a single level of application (e.g., maximum braking) and may therefore have a single distance to stop. In various examples, a trajectory may also indicate, or provide data to determine, an estimated intersection distance or distance to collision using a braking application level associated with that trajectory for a potential collision with an impeding object in a region of travel (e.g., an obstacle in a vehicle path). This may be a distance from a leading edge (e.g., front bumper) of a vehicle to the closest surface of the impeding object if braking pressure associated with that trajectory is applied.

For example, a normal braking trajectory component 306 may be configured to determine a trajectory for use under normal driving conditions where hard or maximum braking application levels are unlikely to be used. The normal braking trajectory component 306 may determine, in examples using the data 302, a normal braking trajectory 314. The normal braking trajectory 314 may include, among other types of data, data associated with a vehicle path (e.g., region of travel), steering controls, normal braking controls, acceleration, etc. The normal braking trajectory 314 may also, or instead, include a normal braking distance to stop 314a that may be based on the normal braking control associated with the trajectory 314. The normal braking trajectory 314 may also, or instead, include a distance to collision 314b based on the normal braking control associated with the trajectory 314 that may be based a distance between the vehicle for which the trajectory 314 is determined and an obstacle in the vehicle's region of travel. Alternatively, the normal braking trajectory component 306 may be configured to validate and/or modify a received trajectory (e.g., as data 302) as a normal trajectory for use under normal driving conditions.

In another example, a hard braking trajectory component 308 may be configured to determine a trajectory for use when hard braking may be needed, for example, to avoid an obstacle. The hard braking trajectory component 308 may determine, in examples using the data 302, a hard braking trajectory 316. The hard braking trajectory 316 may include, among other types of data, data associated with a vehicle path (e.g., region of travel), steering controls, hard braking controls, etc. The hard braking trajectory 316 may also, or instead, include a hard braking distance to stop 316a that may be based on the hard braking control associated with the trajectory 316. The hard braking trajectory 316 may also, or instead, include a distance to collision 316b based on the hard braking control associated with the trajectory 316 that may be based a distance between the vehicle for which the trajectory 316 is determined and an obstacle in the vehicle's region of travel. Alternatively, the hard braking trajectory component 308 may be configured to validate and/or modify a received trajectory (e.g., as data 302 and/or from normal braking trajectory component 306) as a hard trajectory for use under hard braking conditions. The hard braking trajectory component 308 may modify such a received trajectory to alter the longitudinal profile to include hard braking application levels. In some examples, the hard braking trajectory component 308 may retain other data, such as a lateral profile, in the received trajectory, while in other examples, the hard braking trajectory component 308 may modify other data, such as the lateral profile, in determining the hard braking trajectory 316.

One or more portions of the hard braking trajectory 316 may be the same or similar to portions of the normal braking trajectory 314. For example, when controlling a vehicle around an obstacle is not possible (e.g., cannot leave a road or change lanes) the path and steering controls for both may be the same. In another example, a distance to collision may be the same for both normal braking trajectory 314 and hard braking trajectory 316 (and, in some examples, for all trajectories) because the distance to collision may be dependent only on the vehicle position and the obstacle positions, and therefore may not change regardless of trajectory content. Alternatively or additionally, different trajectories may have different types of data represented therein. For example, while the normal braking trajectory 314 may have acceleration control data, the hard braking trajectory 316 may not include acceleration data because there may be no acceleration when using a hard braking trajectory. In other examples, a trajectory may not include data that will be retrieved from or associated with another trajectory by a vehicle computing system. For example, the hard braking trajectory 316 may not include steering data because, when a hard braking trajectory is determined as an operational trajectory, a vehicle computing system will use the steering data from a contemporary normal braking trajectory for vehicle control. Similarly, a maximum braking trajectory may not include path information because a vehicle computing system may be configured to use the path information from a counterpart hard braking trajectory for vehicle control.

In another example, a maximum braking trajectory component 310 may be configured to determine a trajectory for use when maximum braking may be needed, for example, when hard braking is insufficient to avoid an obstacle. The maximum braking trajectory component 310 may determine, in examples using the data 302, a maximum braking trajectory 318. The maximum braking trajectory 318 may include, among other types of data, maximum braking controls. In examples, there may be a single level of braking application for a maximum braking trajectory of full application of braking capabilities (e.g., including the use of antilock braking features). The maximum braking trajectory 318 may also, or instead, include a maximum braking distance to stop 318a that may be based on the maximum braking control associated with the trajectory 318. The maximum braking trajectory 318 may also, or instead, include a distance to collision 318b based on the maximum braking control associated with the trajectory 318 that may be based a distance between the vehicle for which the trajectory 318 is determined and an obstacle in the vehicle's region of travel. In examples, the path used with the maximum braking trajectory 318 may be the path associated with the hard braking trajectory 316. Alternatively, the maximum braking trajectory 318 may not include or be associated with a path or region of travel. In various examples, the maximum braking trajectory component 310 may be configured to validate and/or modify a received trajectory (e.g., as data 302, from normal braking trajectory component 306, and/or from hard braking trajectory component 308) as a maximum trajectory for use under maximum braking conditions. The maximum braking trajectory component 310 may modify such a received trajectory to alter the longitudinal profile to include maximum braking application levels. In some examples, the maximum braking trajectory component 310 may retain other data, such as a lateral profile, in the received trajectory, while in other examples, the maximum braking trajectory component 310 may modify other data, such as the lateral profile, in determining the maximum braking trajectory 318.

In various examples, the distance to stop 318a may include a buffer distance that accommodates a reduction in braking performance due to various conditions. For example, road surface conditions, tire conditions, brake component conditions, and/or other factors may increase the distance to stop for a vehicle under the application of maximum braking level. The distances to stop 314a and 316a may also include such buffer distances. However, buffer distances may not be as significant for normal and hard braking level applications because there may be varying levels of braking pressure that may be applied in normal and hard braking level applications.

In another example, a vehicle lock trajectory component 312 may be configured to determine a trajectory for use when complete vehicle disablement may be desired, for example, when the vehicle is reported stolen. The vehicle lock trajectory component 312 may determine, in examples using the data 302, a vehicle lock trajectory 320. The vehicle lock trajectory 320 may include controls locking or otherwise disabling one or more vehicle components. For example, the vehicle lock trajectory 320 may include controls for locking the steering, activating a parking brake, applying maximum brake pressure to the brakes, etc.

The vehicle trajectory determination system 304 may also include an operational trajectory determination component 322 that is configured to determine a vehicle operational trajectory 324 from among candidate trajectories. For example, the operational trajectory determination component 322 may determine an operational trajectory from among candidate trajectories normal braking trajectory 314, hard braking trajectory 316, maximum braking trajectory 318, and vehicle lock trajectory 320. To make this determination, the operational trajectory determination component 322 may use data 302, a current operational trajectory, and/or data from one or more candidate trajectories.

For example, the operational trajectory determination component 322 may use a current obstacle position from data 302 to determine that an obstacle is in a region of travel of a vehicle based on a current operational trajectory region of travel. The operational trajectory determination component 322 may then determine that the current operational trajectory is a hard braking trajectory and that the obstacle is likely to be collided with based on a distance to stop and a distance to collision associated with the current operational trajectory. The operational trajectory determination component 322 may further determine that the distance to stop associated with the maximum braking trajectory 318 is substantially similar to the distance to collision (as represented in either the current operational hard braking trajectory and/or the candidate maximum braking trajectory 318). Based on these determinations, the operational trajectory determination component 322 may determine to use the candidate maximum braking trajectory 318 as the vehicle operational trajectory 324.

Figure 4A:
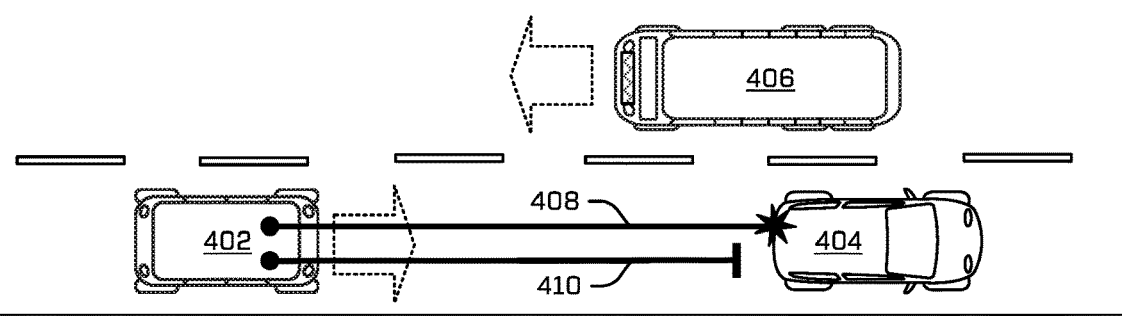
FIGS. 4A-C depict block diagrams representing an example vehicle, environment, stopping distance, and collision distance, in accordance with examples of the disclosure.
Figure 5:
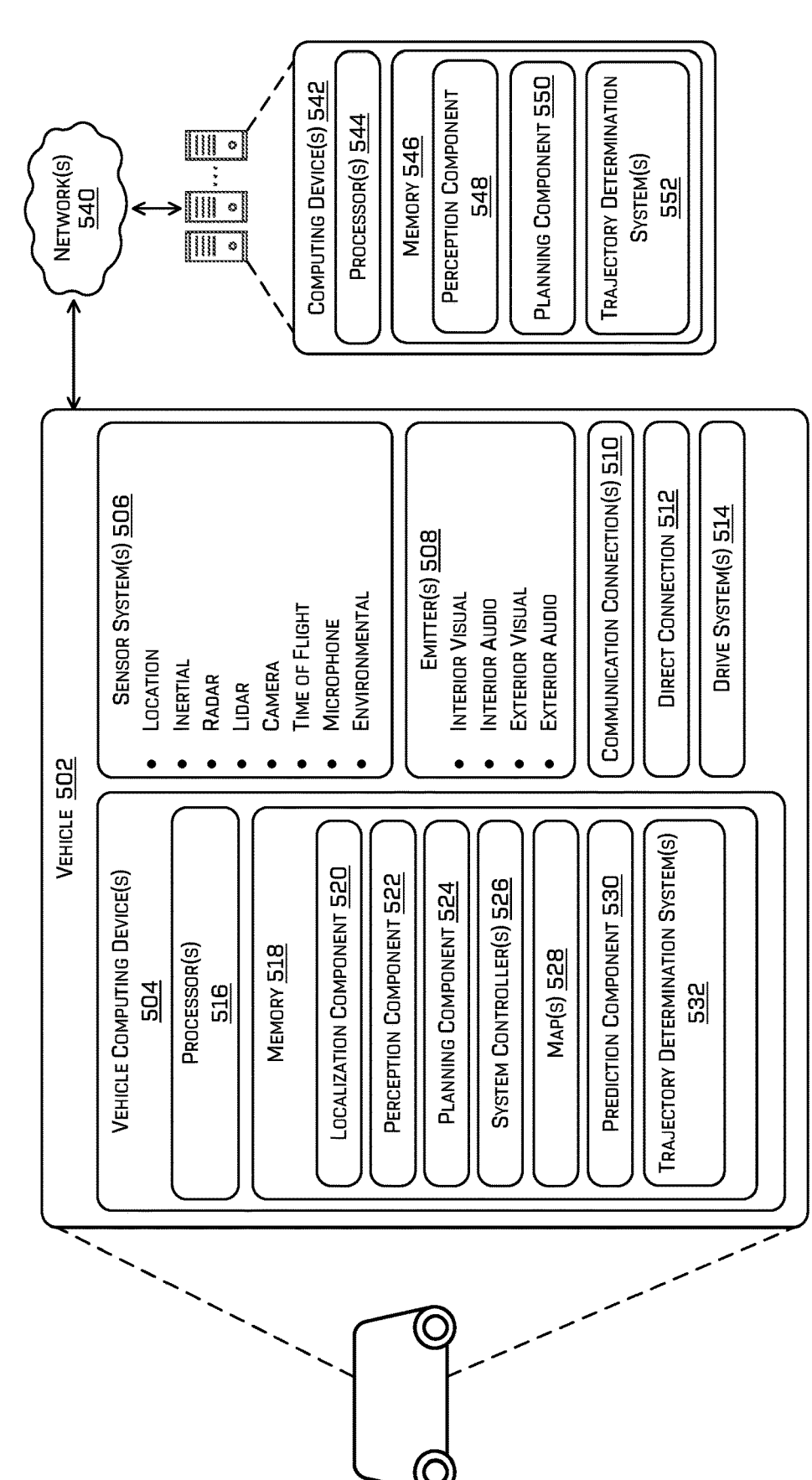
FIG. 5 depicts a block diagram of an example system for implementing the techniques described herein.

FIG. 4A is a top-down view of an example environment 400 in which a vehicle 402 may be traveling. The vehicle 402 may be configured with a sensor system that may allow a vehicle computing system configured at the vehicle 402 to collect data in the environment 400, detect objects, make various determinations, etc. The vehicle 402 may be sharing a road with other vehicles, such as vehicle 404 traveling in the same direction and in the same lane as the vehicle 402 and a vehicle 406 traveling in the opposite direction of vehicle 404 in the next lane.

The vehicle 402 may be traveling under normal conditions and therefor using a normal braking trajectory as an operational trajectory. The vehicle 402 may determine that the vehicle 404 is an obstacle in the region of travel of the vehicle 402. The vehicle computing system of the vehicle 402 may determine, based on the current operational (normal braking) trajectory and/or sensor data, a distance between the vehicle 402 and the vehicle 404 as a distance to collision 408. The vehicle computing system of the vehicle 402 may also, or instead, determine, based on the current operational (normal braking) trajectory, a distance to stop 410 for the vehicle 402. As can be seen in this figure, in this example, at the positions of the vehicles 402 and 404 and under vehicle control based on the current operational (normal braking) trajectory, the distance to stop 410 is less than the distance to collision 408. Therefore, under the conditions of the example illustrated in FIG. 4A, the vehicle computing device may determine that the current operational trajectory and available braking application level is sufficient to avoid a potential collision with the vehicle 404.

Figure 4B:
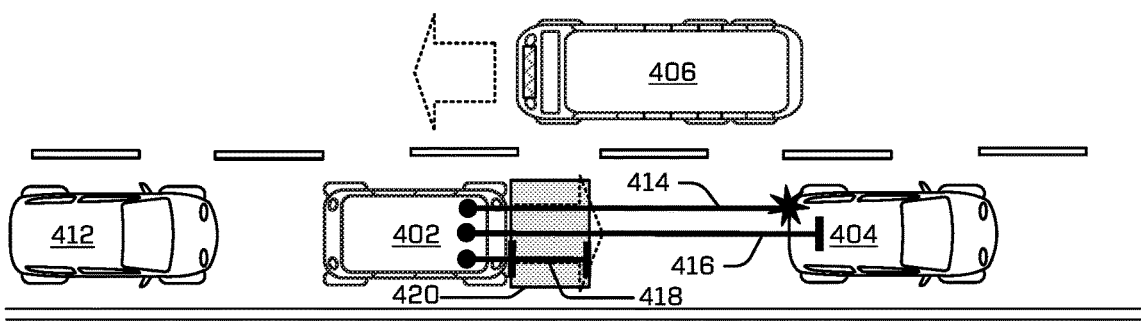

FIG. 4B is another top-down view of the example environment 400 in which the vehicle 402 may be traveling, for example, at a later time than the example of FIG. 4A, along with vehicles 404 and 406. Also shown in this example, is a following vehicle 412. As can be seen in this figure, the vehicle computing system of the vehicle 402 may determine that a distance to collision 414 between the vehicle 402 and the vehicle 404 is less than a distance to stop 416. Therefore, in this example, the current operational trajectory may not facilitate the stopping of the vehicle 402 before colliding with the vehicle 404. In examples, the vehicle computing system may have determined that a previous, normal braking operational trajectory may not have been sufficient to avoid a potential collision with the vehicle 404 and may have, in response, determined to use a hard braking trajectory as the operational trajectory. However, the hard braking trajectory may have also provided a distance to collision 414 that is less than a distance to stop 416.

Even though a maximum braking trajectory may be available to the vehicle computing system of the vehicle 402, the vehicle computing system may not determine the maximum braking trajectory as the operational trajectory because the maximum braking trajectory distance to stop 418 (which may include a buffer distance 420) may be substantially less than the distance to collision 414. Therefore, in the interest of passenger safety and of not causing a rear-end collision with the vehicle 412, the vehicle computing system may continue to use a hard braking trajectory as the operational trajectory and continue to apply hard braking pressure.

Figure 4C:
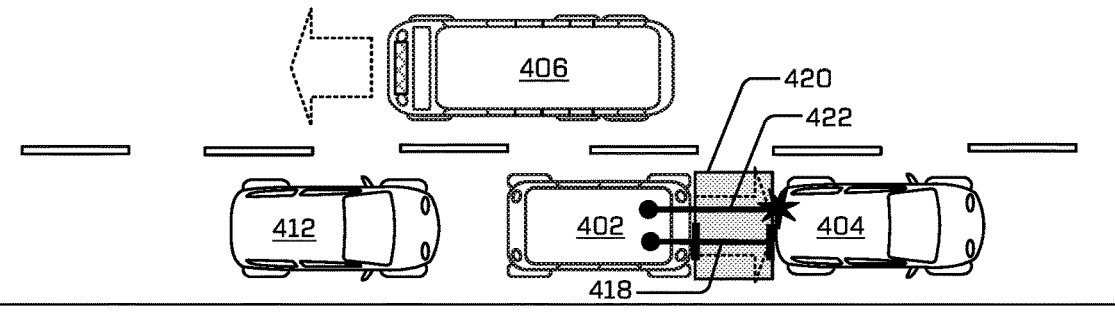

FIG. 4C is another top-down view of the example environment 400 in which the vehicle 402 may be traveling, for example, at a later time than the example of FIG. 4B, along with vehicles 404, 406, and 412. As can be seen in this figure, the vehicle computing system of the vehicle 402 may determine that a distance to collision 422 between the vehicle 402 and the vehicle 404 is substantially similar or the same as a distance to stop 418 associated with the maximum braking trajectory (for example, when the buffer distance 420 is included in the distance to stop 418 for the maximum braking trajectory). Based on determining that the distance to stop 418 is about the same as the distance to collision 422, the vehicle computing system may determine to use the maximum braking trajectory as the operational trajectory. In this and other examples, the use of a maximum braking trajectory and/or a maximum braking level may be delayed until it is truly needed to avoid a potential collision.

FIG. 5 depicts a block diagram of an example system 500 for implementing the techniques described herein. In at least one example, the system 500 can include a vehicle 502. The vehicle 502 can include a vehicle computing system or device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and one or more trajectory determination systems 532. Though depicted in FIG. 5 as residing in memory 518 for illustrative purposes, it is contemplated that each of the localization component 520, the perception component 522, the planning component 524, the one or more system controllers 526, the one or more maps 528, the prediction component 530, and the trajectory determination system(s) 532 can additionally, or alternatively, be accessible to the vehicle 502 (e.g., stored remotely). Alternatively or additionally, the trajectory determination system(s) 532 may be a component of and/or associated with a remote computing device and/or a separate (e.g., secondary) computing device. Examples of systems and methods for using a secondary computing device as trajectory determination system are provided in U.S. patent application Ser. No. 17/514,542, filed Oct. 29, 2021, entitled "Collision Avoidance and Mitigation in Autonomous Vehicles," the entirety of which is incorporated herein by reference.

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network that may be configured with a convolutional neural network (CNN). The CNN may include one or more convolution/deconvolution layers. Alternatively, or in addition, the one or more trajectory determination systems 532 may include a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data, audio data, collision data, and/or other types of data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing one or more perception components 548, planning components 550, and/or one or more trajectory determination systems 552. In some instances, the one or more trajectory determination systems 552 can substantially correspond the one or more trajectory determination systems 532 and can include substantially similar functionality. In some instances, the perception component 548 can substantially correspond to the perception component 522 and can include substantially similar functionality. In some instances, the planning component 550 can substantially correspond to the planning component 524 and can include substantially similar functionality.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a trajectory for a vehicle to traverse through an environment; receiving sensor data; detecting, based at least in part on the sensor data, an object proximate the vehicle; determining a first distance to stop and, based at least in part on a first braking application level associated with the trajectory, a first estimated intersection distance between the vehicle and a first predicted intersection of the vehicle and the object; determining that the first distance to stop is greater than the first estimated intersection distance; determining, based at least in part on a first modification of the trajectory comprising a second braking application level, a second distance to stop and a second estimated intersection distance between the vehicle and a second predicted intersection of the vehicle and the object; determining that the second distance to stop is less than the second estimated intersection distance; determining, based at least in part on a second modification of the trajectory comprising a third braking application level, a third distance to stop and a third estimated intersection distance between the vehicle and a third predicted intersection of the vehicle and the object; and based at least in part on determining that the first distance to stop is greater than the first estimated intersection distance and the second distance to stop is less than the second estimated intersection distance, braking the vehicle based at least on part on the first modification of the trajectory using the second braking application level.

B: The system of paragraph A, wherein the sensor data is associated with a first time, and wherein the operations further comprise: receiving additional sensor data at a second time after the first time; determining, based at least in part on the additional sensor data and the second modification of the trajectory, a fourth distance to stop and a fourth estimated intersection distance between the vehicle and a fourth predicted intersection of the vehicle and the object; determining that the fourth distance to stop is greater than or equal to the fourth estimated intersection distance; and based at least in part on determining that the fourth distance to stop is greater than or equal to the fourth estimated intersection distance, braking the vehicle based at least on part on the second modification of the trajectory using the third braking application level.

C: The system of paragraph A or B, wherein the sensor data is associated with a first time, and wherein the operations further comprise: receiving additional sensor data at a second time after the first time; determining, based at least in part on the additional sensor data, a fourth distance to stop and, based at least in part on the first modification of the trajectory, a fourth estimated intersection distance between the vehicle and a fourth predicted intersection of the vehicle and the object; determining, based at least in part on the additional sensor data, a fifth distance to stop and, based at least in part on the second modification of the trajectory, a fifth estimated intersection distance between the vehicle and a fifth predicted intersection of the vehicle and the object; determining that the fourth distance to stop is greater than the fourth estimated intersection distance; determining that the fifth distance to stop is less than the fifth estimated intersection distance; and based at least in part on determining that the fourth distance to stop is greater than the fourth estimated intersection distance and the fifth distance to stop is less than the fifth estimated intersection distance, braking the vehicle based at least on part on the first modification of the trajectory using the second braking application level.

D: The system of any of paragraphs A-C, wherein: the trajectory is associated with a lateral trajectory profile; the first modification of the trajectory is associated with the lateral trajectory profile; and the second modification of the trajectory is associated with the lateral trajectory profile.

E: The system of any of paragraphs A-D, wherein the operations further comprise: determining that the vehicle is stationary; and based at least in part on determining that the vehicle is stationary and braking the vehicle based at least on part on one of the first modification of the trajectory or the second modification of the trajectory, transmitting a notification to a remote operator indicating that the vehicle is stationary.

F: One or more non-transitory computer-readable media storing instructions that, when executed by one or more processors, perform operations comprising: determining, based at least in part on sensor data associated with an environment, data representing an object in a region of travel for a vehicle in the environment; receiving a trajectory for controlling the vehicle; determining, as a selected trajectory, one of: the trajectory based at least in part on a first distance to stop associated with the trajectory being less than a first distance to a first estimated intersection between the vehicle and the object, a first modified trajectory based at least in part on a second distance to stop associated with the first modified trajectory being less than or equal to a second distance to a second estimated intersection between the vehicle and the object, or a second modified trajectory based at least in part on a third distance to stop associated with the second modified trajectory being greater than or equal to a third distance to a third estimated intersection between the vehicle and the object; and controlling the vehicle based at least in part on the selected trajectory.

G: The one or more non-transitory computer-readable media of paragraph F, wherein: the selected trajectory comprises the first modified trajectory, the sensor data is first sensor data associated with a first time, and the operations further comprise: determining, based at least in part on second sensor data associated with the environment at a second time after the first time, second data representing the object in the region of travel for the vehicle in the environment; determining a fourth distance to stop and a fourth distance to a fourth estimated intersection between the vehicle and the object for the first modified trajectory; determining that the fourth distance to stop is greater than the fourth distance to the fourth estimated intersection; and based at least in part on determining that the fourth distance to stop is greater than the fourth distance to the fourth estimated intersection, braking the vehicle based at least on part on the second modified trajectory.

H: The one or more non-transitory computer-readable media of paragraph G, wherein: the operations further comprise: determining a fifth distance to stop and a fifth distance to a fifth estimated intersection between the vehicle and the object for the second modified trajectory; and determining that the fifth distance to stop is equal to or greater than the fifth distance to the fifth estimated intersection; and braking the vehicle based at least on part on the second modified trajectory is further based at least in part on determining that the fifth distance to stop is equal to or greater than the fifth distance to the fifth estimated intersection.

I: The one or more non-transitory computer-readable media of any of paragraphs F-H, wherein: the first modified trajectory is determined based on increasing a rate of deceleration of the trajectory to less than a maximum deceleration, and the second modified trajectory is determined based on increasing the rate of deceleration of the trajectory to the maximum deceleration.

J: The one or more non-transitory computer-readable media of any of paragraphs F-I, wherein the third distance to stop comprises a buffer distance.

K: The one or more non-transitory computer-readable media of paragraph J, wherein the buffer distance is based at least in part on one or more of: a speed of the vehicle, presence of precipitation, a location of the vehicle, an uncertainty associated with a component of the vehicle, a road surface, a grade of the road surface, or tracking error.

L: The one or more non-transitory computer-readable media of any of paragraphs F-K, wherein: the trajectory is associated with a first range of braking pressures; the first modified trajectory is associated with a second range of braking pressures that are greater than the first range of braking pressures; and the second modified trajectory is associated with a third range of braking pressures that are greater than the second range of braking pressures.

M: The one or more non-transitory computer-readable media of any of paragraphs F-L, wherein: the trajectory comprises a lateral profile; the first modified trajectory comprises the lateral profile; and the second modified trajectory comprises the lateral profile.

N: The one or more non-transitory computer-readable media of any of paragraphs F-M, wherein: the selected trajectory comprises one of the first modified trajectory or the second modified trajectory; and the operations further comprise: determining that the vehicle is stationary; and based at least in part on determining that the vehicle is stationary and the selected trajectory comprising one of the first modified trajectory or the second modified trajectory, transmitting a notification to a remote operator indicating that the vehicle is stationary.

O: A method comprising: determining, based at least in part on sensor data associated with an environment, data representing an object in a region of travel for a vehicle in the environment; determining, as an operational trajectory for controlling a vehicle, one of: a first trajectory associated with a first braking level, a second trajectory determined based at least in part on the first trajectory and comprising a second braking level greater than the first braking level, or a third trajectory determined based at least in part on the first trajectory and comprising a third braking level greater than the second braking level; and controlling the vehicle based at least in part on the operational trajectory.

P: The method of paragraph O, wherein: the operational trajectory comprises the first trajectory; and the sensor data is first sensor data associated with a first time; the method further comprising: determining, based at least in part on second sensor data associated with the environment at a second time after the first time, second data representing the object in the region of travel for the vehicle in the environment; and based at least in part on determining that a distance to stop is greater than a distance between the vehicle and a predicted intersection point, controlling the vehicle according to one or more of the second trajectory or the third trajectory.

Q: The method of paragraph O or P, wherein the third braking level comprises a maximum braking level of the vehicle.

R: The method of paragraph Q, wherein: the operational trajectory is one of the first trajectory or the second trajectory; the method further comprising: determining that the vehicle is stationary; and based at least in part on determining that the vehicle is stationary and that the operational trajectory is one of the first trajectory or the second trajectory, transmitting a notification to a remote operator indicating that the vehicle is stationary.

S: The method of any of paragraphs O-R, wherein one or more of the first trajectory, the second trajectory, or the third trajectory is associated with a buffer distance determined based at least in part on one or more of environmental conditions, operational conditions, road conditions, or vehicle conditions.

T: The method of any of paragraphs O-S, wherein a lateral profile of one or more of the second trajectory or the third trajectory is substantially similar to a lateral profile of the first trajectory.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving a trajectory for a vehicle to traverse through an environment;
receiving sensor data;
detecting, based at least in part on the sensor data, an object proximate to the vehicle;
at a first time:
determining a first distance to stop and, based at least in part on a first braking application level configured in the trajectory, a first estimated intersection distance between the vehicle and a first predicted intersection of the vehicle and the object;
determining that the first distance to stop is greater than the first estimated intersection distance;
determining, based at least in part on a first modification of the trajectory comprising a second braking application level greater than and distinct from the first braking application level, a second distance to stop and a second estimated intersection distance between the vehicle and a second predicted intersection of the vehicle and the object;
determining that the second distance to stop is less than the second estimated intersection distance;
determining, based at least in part on a second modification of the trajectory comprising a third braking application level greater than and distinct from the first braking application level and the second braking application level, a third distance to stop and a third estimated intersection distance between the vehicle and a third predicted intersection of the vehicle and the object; and
based at least in part on determining that the first distance to stop is greater than the first estimated intersection distance and the second distance to stop is less than the second estimated intersection distance, braking the vehicle based at least on part on the first modification of the trajectory using the second braking application level; and at a second time after the first time:
determining a fourth distance to stop, and based at least in part on the first braking application level, a fourth estimated intersection distance between the vehicle and a fourth predicted intersection of the vehicle and the object;
determining that the fourth distance to stop is less than the fourth estimated intersection distance; and
based at least in part on determining that the fourth distance to stop is less than the fourth estimated intersection distance, braking the vehicle based at least on part on the trajectory using the first braking application level.

2. The system of claim 1, wherein the operations further comprise:

receiving additional sensor data at a third time after the second time;

determining, based at least in part on the additional sensor data and the second modification of the trajectory, a fifth distance to stop and a fifth estimated intersection distance between the vehicle and a fifth predicted intersection of the vehicle and the object;

determining that the fifth distance to stop is greater than or equal to the fifth estimated intersection distance; and based at least in part on determining that the fifth distance to stop is greater than or equal to the fifth estimated intersection distance, braking the vehicle based at least on part on the second modification of the trajectory using the third braking application level.

3. The system of claim 1, wherein the operations further comprise:

receiving additional sensor data at a third time after the second time;

determining, based at least in part on the additional sensor data, a fifth distance to stop and, based at least in part on the first modification of the trajectory, a fifth estimated intersection distance between the vehicle and a fifth predicted intersection of the vehicle and the object;

determining, based at least in part on the additional sensor data, a sixth distance to stop and, based at least in part on the second modification of the trajectory, a sixth estimated intersection distance between the vehicle and a sixth predicted intersection of the vehicle and the object;

determining that the fifth distance to stop is greater than the fifth estimated intersection distance;

determining that the sixth distance to stop is less than the fifth estimated intersection distance; and based at least in part on determining that the fifth distance to stop is greater than the fifth estimated intersection distance and the sixth distance to stop is less than the fifth estimated intersection distance, braking the vehicle based at least on part on the first modification of the trajectory using the second braking application level.

4. The system of claim 1, wherein:

the trajectory is associated with a lateral trajectory profile;

the first modification of the trajectory is associated with the lateral trajectory profile; and the second modification of the trajectory is associated with the lateral trajectory profile.

5. The system of claim 1, wherein the operations further comprise:

determining that the vehicle is stationary; and based at least in part on determining that the vehicle is stationary and braking the vehicle based at least on part on one of the first modification of the trajectory or the second modification of the trajectory, transmitting a notification to a remote operator indicating that the vehicle is stationary.

6. One or more non-transitory computer-readable media storing instructions that, when executed by one or more processors, perform operations comprising:

determining, based at least in part on sensor data associated with an environment, data representing an object in a region of travel for a vehicle in the environment;

receiving a trajectory for controlling the vehicle comprising a first distance to stop based at least in part on a first braking application level configured in the trajectory;

determining a first modified trajectory based at least in part on the trajectory and comprising a second distance to stop associated with a second braking application level configured in the first modified trajectory and distinct from the first braking application level;

determining a second modified trajectory based at least in part on the trajectory and comprising a third distance to stop associated with a third braking application level configured in the second modified trajectory and distinct from the first braking application level and the second braking application level;

at a first time:

determining, based at least in part on determining that the first distance to stop is greater than a first estimated intersection distance between the vehicle and the object and that the second distance to stop is less than the first estimated intersection distance, to control the vehicle using the first modified trajectory; and braking the vehicle based at least in part on the first modified trajectory; and at a second time after the first time:

determining, based at least in part on determining that the first distance to stop is less than a second estimated intersection distance between the vehicle and the object, to control the vehicle using the trajectory; and controlling the vehicle based at least in part on the trajectory.

7. The one or more non-transitory computer-readable media of claim 6, wherein:

the operations further comprise:

determining, based at least in part on second sensor data associated with the environment at a third time after the second time, second data representing the object in the region of travel for the vehicle in the environment;

determining a fourth distance to stop and a third estimated intersection distance between the vehicle and the object for the first modified trajectory;

determining that the fourth distance to stop is greater than the fourth distance to the third estimated intersection distance; and based at least in part on determining that the fourth distance to stop is greater than the third estimated intersection distance, braking the vehicle based at least on part on the second modified trajectory.

8. The one or more non-transitory computer-readable media of claim 7, wherein:

the operations further comprise:

determining a fifth distance to stop and a fourth estimated intersection distance between the vehicle and the object for the second modified trajectory;

determining that the fifth distance to stop is equal to or greater than the fourth estimated intersection distance; and braking the vehicle based at least on part on the second modified trajectory is further based at least in part on determining that the fifth distance to stop is equal to or greater than the fourth estimated intersection distance.

9. The one or more non-transitory computer-readable media of claim 6, wherein:

the first modified trajectory is determined based on increasing a rate of deceleration of the trajectory to less than a maximum deceleration, and the second modified trajectory is determined based on increasing the rate of deceleration of the trajectory to the maximum deceleration.

10. The one or more non-transitory computer-readable media of claim 6, wherein the third distance to stop comprises a buffer distance.

11. The one or more non-transitory computer-readable media of claim 10, wherein the buffer distance is based at least in part on one or more of:

a speed of the vehicle, presence of precipitation, a location of the vehicle, an uncertainty associated with a component of the vehicle, a road surface, a grade of the road surface, or tracking error.

12. The one or more non-transitory computer-readable media of claim 6, wherein:

the trajectory is associated with a first range of braking pressures;

the first modified trajectory is associated with a second range of braking pressures that are greater than the first range of braking pressures; and the second modified trajectory is associated with a third range of braking pressures that are greater than the second range of braking pressures.

13. The one or more non-transitory computer-readable media of claim 6, wherein:

the trajectory comprises a lateral profile and a first longitudinal profile;

the first modified trajectory comprises the lateral profile and a second longitudinal profile distinct from the first longitudinal profile; and the second modified trajectory comprises the lateral profile and a third longitudinal profile distinct from the first longitudinal profile and the second longitudinal profile.

14. The one or more non-transitory computer-readable media of claim 6, wherein:

the operations further comprise:

determining that the vehicle is stationary; and based at least in part on determining that the vehicle is stationary, transmitting a notification to a remote operator indicating that the vehicle is stationary.

15. A method comprising:

determining, based at least in part on sensor data associated with an environment, data representing an object in a region of travel for a vehicle in the environment;

determining a first distance to stop for a first trajectory comprising a first braking level;

determining a second distance to stop for a second trajectory determined based at least in part on the first trajectory and associated with a second braking level configured in the second trajectory and distinct from and greater than the first braking level;

determining a third distance to stop for a third trajectory determined based at least in part on the first trajectory and associated with a third braking level configured in the third trajectory and distinct from and greater than the first braking level and the second braking level;

at a first time:

determining, based at least in part on determining that the first distance to stop is greater than a first estimated intersection distance between the vehicle and the object and that the second distance to stop is less than the first estimated intersection distance, to control the vehicle using the second trajectory; and braking the vehicle based at least in part on the second trajectory; and at a second time after the first time:

determining, based at least in part on determining that the first distance to stop is less than a second estimated intersection distance between the vehicle and the object, to control the vehicle using the first trajectory; and controlling the vehicle based at least in part on the first trajectory.

16. The method of claim 15, further comprising:

determining, based at least in part on second sensor data associated with the environment at a third time after the second time, second data representing the object in the region of travel for the vehicle in the environment; and based at least in part on determining that a fourth distance to stop is greater than a third estimated intersection distance between the vehicle and a predicted intersection point, controlling the vehicle according to one or more of the second trajectory or the third trajectory.

17. The method of claim 15, wherein the third braking level comprises a maximum braking level of the vehicle.

18. The method of claim 17, further comprising:

determining that the vehicle is stationary; and based at least in part on determining that the vehicle is stationary transmitting a notification to a remote operator indicating that the vehicle is stationary.

19. The method of claim 15, wherein one or more of the first trajectory, the second trajectory, or the third trajectory is associated with a buffer distance determined based at least in part on one or more of environmental conditions, operational conditions, road conditions, or vehicle conditions.

20. The method of claim 15, wherein a lateral profile of one or more of the second trajectory or the third trajectory corresponds to a lateral profile of the first trajectory.

* * * * *